(12) United States Patent
He et al.

(10) Patent No.: US 12,311,576 B1
(45) Date of Patent: May 27, 2025

(54) SYSTEM FOR $CO_2$ STORAGE AND UTILIZATION OF CONCRETE MIXING PLANT AND METHOD THEREOF

(71) Applicant: Hubei University Of Technology, Hubei (CN)

(72) Inventors: Xingyang He, Hubei (CN); Gehua Zheng, Hubei (CN); Fei Dai, Hubei (CN); Jin Yang, Hubei (CN); Ying Su, Hubei (CN); Yingbin Wang, Hubei (CN); Zhengqi Zheng, Hubei (CN); Huahui Qi, Hubei (CN)

(73) Assignee: Hubei University of Technology, Hubei (CN)

( * ) Notice: Subject to any disclaimer, the term of this patent is extended or adjusted under 35 U.S.C. 154(b) by 0 days.

(21) Appl. No.: 18/844,399

(22) PCT Filed: Jun. 7, 2024

(86) PCT No.: PCT/CN2024/097910
§ 371 (c)(1),
(2) Date: Sep. 6, 2024

(87) PCT Pub. No.: WO2025/025813
PCT Pub. Date: Feb. 6, 2025

(30) Foreign Application Priority Data

Jul. 31, 2023 (CN) .......................... 202310961394.6

(51) Int. Cl.
*B28C 9/02* (2006.01)
*B01F 23/70* (2022.01)
*B01F 33/80* (2022.01)

(52) U.S. Cl.
CPC ................ *B28C 9/02* (2013.01); *B01F 23/71* (2022.01); *B01F 33/83613* (2022.01)

(58) Field of Classification Search
CPC .......... B29B 7/60; B29B 7/603; C04B 12/00; C04B 40/0032; C04B 28/02;
(Continued)

(56) References Cited

U.S. PATENT DOCUMENTS 7,906,086 B2 * 3/2011 Comrie .................. C04B 7/367
423/220
8,105,558 B2 * 1/2012 Comrie .................. C04B 7/367
106/713
(Continued)

FOREIGN PATENT DOCUMENTS

CA       2469974     12/2005
CN     113840813     12/2021
(Continued)

*Primary Examiner* — Charles Cooley
(74) *Attorney, Agent, or Firm* — JCIP GLOBAL INC.

(57) ABSTRACT

The present disclosure provides a system for $CO_2$ storage and utilization of a concrete mixing plant and a method thereof. The system includes a slurry making module, a cyclic grinding module and a material storage and application module. The cyclic grinding module can grind, in the presence of a gas containing $CO_2$ and medium balls, a composite slurry prepared by the slurry making module, and can cyclically use the gas containing $CO_2$, so as to realize continuous production of a carbon-mineralized slurry. The material storage and application module includes a material storage bin and a mixing machine connected with each other, and the material storage bin is configured to receive and store the carbon-mineralized slurry from a slurry bin. The mixing machine is configured to mix and prepare the carbon-mineralized slurry into a commodity concrete.

9 Claims, 6 Drawing Sheets

(58) Field of Classification Search
CPC . C04B 40/0231; C04B 22/06; C04B 22/0046;
C04B 28/04; B28C 5/00; B28C 5/422;
B28C 5/4237; B28C 5/003; B28C 7/12;
B28C 7/0418; B28C 7/0454; B28C 9/02;
B01F 15/00136; B01F 15/00162; B01F
3/04099; B01F 13/0037; B01F 3/04439;
B01F 9/00; B01F 15/00175; B01F
2215/0047; B01F 7/12; B01F 15/00142;
B01F 23/71; B01F 33/83613; G01F 1/00;
G01F 1/86; C02F 1/66; C02F 2209/005;
C02F 2209/02; C02F 2209/05; C02F
2209/06; C02F 2209/245; C02F 2209/42;
C02F 2209/44; C02F 2103/12; C02F
2209/24; Y02P 40/18; Y02W 30/91
See application file for complete search history.

(56) References Cited

U.S. PATENT DOCUMENTS

| 2014/0216303 | A1* | 8/2014 | Lee | B01F 35/91 |
| | | | | 106/638 |
| 2021/0284545 | A1 | 9/2021 | Heidel et al. | |
| 2022/0212992 | A1 | 7/2022 | Skocek et al. | |
| 2023/0382790 | A1* | 11/2023 | Yang | C04B 7/1535 |

FOREIGN PATENT DOCUMENTS

| CN | 114907040 | | 8/2022 | |
| CN | 116283037 | | 6/2023 | |
| CN | 116749348 | A * | 9/2023 | ............... B28C 9/02 |
| JP | 2014117636 | | 6/2014 | |
| WO | WO-2021105726 | A1 * | 6/2021 | ........... B28C 7/0007 |

\* cited by examiner

SYSTEM FOR $CO_2$ STORAGE AND UTILIZATION OF CONCRETE MIXING PLANT AND METHOD THEREOF

CROSS-REFERENCE TO RELATED APPLICATION

This application is a 371 of international application of PCT application serial no. PCT/CN2024/097910, filed on Jun. 7, 2024, which claims the priority benefit of China application no. 202310961394.6, filed on Jul. 31, 2023. The entirety of each of the above mentioned patent applications is hereby incorporated by reference herein and made a part of this specification.

TECHNICAL FIELD

The present disclosure relates to the field of $CO_2$ storage and utilization technologies and in particular to a system for $CO_2$ storage and utilization of a concrete mixing plant and a method thereof.

DESCRIPTION OF RELATED ART

The non-in situ mineralization technology refers to a process technology in which natural calcium magnesium silicate minerals (olivine and serpentine and the like) and industrial solid wastes (fly ashes, scraps from steel industry and waste concretes and the like), after being pretreated such as being crushed and screened etc. perform mineralization reaction with $CO_2$ gas and the final solid products are permanently stored in the form of carbonate while high-value-added chemical products are obtained. At present, there are the following major technical routes.

(1) Thermal activation mineralization $CO_2$ process: the high-temperature mineralization furnace (650 to 700° C.) enables a decomposition product CaO of carbide slag to perform mineralization reaction with $CO_2$ in the fumes so as to realize $CO_2$ fixation. Although the technical route can realize quick $CO_2$ fixation, the calcium-based preparation process consumes a large quantity of energy and the generated carbon emission is sufficient to offset the fixed $CO_2$. Further, the preparation process has extremely rigorous requirements for the carbide slag raw material. The impurities such as silicon, aluminum and iron oxides in the carbide slag have significant impact on the quality of the mineralization products. Further, the existing pretreatment process is complex.

(2) Catalytic activation mineralization $CO_2$ process: recoverable $(NH_4)_2SO_4$ is used as an aid to be mixed with blast furnace slag at a ratio and then activated (350° C. to 370° C.), and $NH_3$ released from the activation reacts with $CO_2$ in the fumes to generate ammonium carbonate and ammonium bicarbonate; calcium and magnesium ingredients leached from the activation slag can react with ammonium bicarbonate and ammonium carbonate respectively to produce corresponding mineralization products. $(NH_4)_2SO_4$ obtained by performing evaporation crystallization on the after-reaction filtrate can be recycled. This technical route realizes $CO_2$ capture and storage and blast furnace slag resource integration and utilization. But the mineralization process still requires heated activation, leading to increased carbon emission, and further, the leaching efficiency of calcium and magnesium is affected by the blast furnace slag crystallization phase. The low concentration of ammonium sulfate in the filtrate increases the energy consumption of the evaporation and crystallization of ammonium sulfate.

(3) $CO_2$ mineralization concrete curing process: By mineralization reaction between $CO_2$ (generally, gas) and gel ingredient and other alkaline calcium and magnesium components in pre-cured or early-hydrated concrete members, carbonate product is formed in the internal pores and interface structures of the concretes so as to realize $CO_2$ fixation. Compared with conventional high-energy consumption steam curing (1 to 2 days) or natural curing (28 days) for production of concrete, this technology can shorten the curing time to within several hours and reduce carbon dioxide emission by 30 to 40% in the concrete production process. However, the carbonization curing of the concrete members mainly relies on $CO_2$ seepage. When the concrete surface is completely carbonized, it is difficult for $CO_2$ to seep into the concrete, especially into the high-strength concrete with very compact surface. Therefore, there is a large limitation. The seepage force of the carbon dioxide can be increased by pressurization but the pressurization condition is very stringent.

(4) $CO_2$ mineralization enhanced recycled aggregate process: since the aggregate surface is covered with cement slurry, calcium and calcium silicate hydrate therein can react with $CO_2$ to generate $CaCO_3$ and silica gel which are then filled into the pores of the recycled aggregate, so as to improve the aggregate performance. The aggregate enhanced by this technical route can be used to replace natural aggregate for production of building materials, which extremely reduces the consumption of the mineral resources and energy. But, due to difficult seepage into the micropores on the surface of the recycled aggregate and limitation of diffusion of the product layer, under the normal pressure, the mineralization efficiency is low, and the diffusion and mass transfer rates of the mixed components in the concrete are small, and the carbonization cost of the recycled aggregate is high, leading to low economic benefits.

(5) Wet mineralization $CO_2$ process: the solid wastes such as fly ashes and construction waste micropowders are dissolved in water into which $CO_2$ is introduced. Since the basic constituents such as $Ca^{2+}$ are dissolved in water, and $CO_2$ is ionized in water into carbonate ions, carbonate mineral precipitate will be generated through reaction, so as to achieve the effect of $CO_2$ fixation. In this technical route, a gas-solid two-phase reaction system is changed into a gas-liquid-solid three-phase reaction system, which increases the carbonization efficiency. But, on one hand, the basic constituents such as $Ca^{2+}$ of the fly ashes and construction wastes and the like dissolved in water are minor and on the other hand, after the solid waste surface is gradually carbonized, the carbonization cannot be continued as in the $CO_2$ mineralization concrete curing process.

Compared with the in-situ mineralization technology, the non-in-situ mineralization technology can realize large-scale emission reduction of $CO_2$ and resource utilization of industrial solid wastes and thus the technology is a process technology having production applicability and good prospect. But, limited by the problems such as carbon fixation and economic costs and the like, the technology is still in the basic research stage and therefore it is necessary to improve and optimize reaction conditions, improve working flow and production apparatuses, reduce process energy consumption, and increase $CO_2$ mineralization efficiency and byproduct yield.

Furthermore, over rapid development of close to 20 years, the commodity concrete industry of China has become a trillion Yuan-scale industry. As shown by incomplete statistics of the Chinese commodity concrete network, the total output of Chinese commodity concrete in 2022 reached 2.651 billion cubic meters. Even if one cubic meter of concrete can only fix 20 kg of $CO_2$, at least 50 million tons of $CO_2$ can be reduced each year. The concrete produced by using the products obtained by $CO_2$ non-in-situ mineralization has good application prospect.

SUMMARY

In order to solve the technical problems of stringent carbon fixation conditions, low carbon fixation efficiency and low carbon fixation amount in the existing non-in-situ mineralization carbon storage and utilization process, in the present disclosure, by improving the liquid phase grinding process parameter conditions, efficient carbon fixation of natural calcium magnesium silicate minerals and industrial solid wastes is realized, and when carbon fixation commodity concrete is prepared, the existing production process of the premixed concrete is not affected and the durability of the concrete is also improved, resulting in significant carbon reduction benefits.

In order to achieve the above objects, a system for $CO_2$ storage and utilization of a concrete mixing plant comprising a slurry making module, a cyclic grinding module and a material storage and application module is provided.

The slurry making module is configured to mix a concrete mixing plant waste slurry, a natural ore and an industrial aid to produce a composite slurry, and convey the composite slurry to the cyclic grinding module.

The cyclic grinding module comprises a grinding machine, a material discharge component and a $CO_2$ circulating component, a mixing element is disposed inside the grinding machine, the mixing element comprises a hollow rotary shaft and medium balls, the material discharge component comprises a gas storage bin and a slurry bin communicated with each other and disposed up and down, the gas storage bin is connected sequentially with the grinding machine and the $CO_2$ circulating component, the gas storage bin is configured to supply a gas containing $CO_2$ to the $CO_2$ circulating component, the $CO_2$ circulating component is configured to convey the gas to the grinding machine and recover a tail gas containing $CO_2$ generated during a grinding process of the gas containing $CO_2$ and the medium balls for the composite slurry in the grinding machine, and the grinding machine is configured to grind and prepare the composite slurry in the presence of the gas containing $CO_2$ and the medium balls into a carbon-mineralized slurry and convey the carbon-mineralized slurry to the slurry bin of the material discharge component.

The material storage and application module comprises a material storage bin and a mixing machine connected with each other, and the material storage bin is configured to receive and store the carbon-mineralized slurry from the slurry bin, and the mixing machine is configured to mix and prepare the carbon-mineralized slurry into a commodity concrete.

Furthermore, the slurry making module comprises a sand stone separating machine, a sand removing machine and a slurry making machine connected sequentially, the slurry making machine comprises a machine body, a slurry outlet at an outer side of the machine body, a material-adding opening on a top of the machine body, a first rotary shaft in a middle of the top of the machine body and a first motor on the top of the machine body, rotary blades are disposed at a lower end of the first rotary shaft and extended into the machine body, and an upper end of the first rotary shaft is connected with a drive part of the first motor through a bevel gear.

The grinding machine comprises a cylinder body, a material inlet at a bottom of the cylinder body, a screen in the cylinder body, a sealed console on a top of the cylinder body and the mixing element in the sealed console, the material inlet is connected with the slurry outlet of the slurry making machine, the screen divides an interior of the cylinder body into an above-screen finished product bin and an under-screen grinding bin, a gas inlet provided with a gas pipe is opened on a top of the sealed console, the mixing element further comprises a second motor and a drive rotary rod, an output end of the second motor is fixedly connected with the drive rotary rod, the drive rotary rod is fixedly connected with the hollow rotary shaft, a top of the hollow rotary shaft is connected with the gas pipe, a lower end of the hollow rotary shaft extends to the grinding bin, centrifugal blades and uniformly-distributed gas outlets are disposed on the hollow rotary shaft in the grinding bin, and a first material outlet is disposed at an outer side of the finished product bin.

A slurry inlet is disposed at a side of the gas storage bin of the material discharge component, the slurry inlet is connected with the first material outlet of the finished product bin, a gas relief opening and a gas pressure meter are disposed on a top of the gas storage bin, the $CO_2$ circulating component is provided with a circulating gas inlet and a circulating gas outlet, the gas relief opening of the gas storage bin is connected with the circulating gas inlet of the $CO_2$ circulating component, the circulating gas outlet is connected with the gas inlet of the grinding machine, and an outlet end of the slurry bin of the material discharge component is connected with a U-shaped pipe.

A feed pipe connected with the U-shaped pipe is disposed at an upper end of an outer side of the material storage bin, and a second material outlet connected with the mixing machine is disposed on a top of the material storage bin.

Furthermore, a cooling cylinder is disposed outside the cylinder body of the grinding machine, and a lower part and an upper part of the cooling cylinder are respectively provided with a water inlet and a water outlet.

An inner bottom of the finished product bin of the grinding machine has an angle of inclination of 5 to 15°.

Furthermore, a weight measurement meter on which a display is disposed is further disposed at a bottom of the machine body of the slurry making machine.

A first electronic valve and a first feed pump are sequentially disposed on the slurry outlet of the slurry making machine.

A second electronic valve and a strainer are sequentially disposed on the material inlet of the grinding machine, and the water inlet of the cooling cylinder is provided with a third electronic valve.

A fourth electronic valve and a second feed pump are sequentially disposed on the U-shaped pipe.

A rotary bearing is disposed on an upper end and a lower end of an interior of the material storage bin respectively, the rotary bearing is connected with a rotational shaft, an end of the rotational shaft away from the rotary bearing is provided with helical blades, and the second material outlet is provided with a third feed pump.

Furthermore, the system comprises a control module configured to control the slurry making module, the cyclic grinding module and the material storage and application module.

The control module is electrically connected with the first electronic valve, the second electronic valve, the third electronic valve, the fourth electronic valve, the first feed pump, the second feed pump, the third feed pump, the first motor, the second motor, the $CO_2$ circulating component, the sand stone separating machine and the sand removing machine respectively.

A method of $CO_2$ storage and utilization of a concrete mixing plant by using the above system is also provided, comprising the following steps.

At step S1, obtaining a composite slurry by mixing a concrete mixing plant waste slurry, a solid waste, a natural ore and an industrial aid in the slurry making machine.

At step S2, conveying the composite slurry into the grinding machine and performing grinding in the presence of the medium balls.

At step S3, after the slurry bin is filled up, sealing the grinding machine and using the $CO_2$ circulating component to convey a gas containing $CO_2$ in the gas storage bin to the grinding machine to enable the composite slurry to go through grinding reaction in the presence of the gas containing $CO_2$ and the medium balls and be prepared into a carbon-mineralized slurry.

At step S4, repeating the step S3 and cyclically using the gas containing $CO_2$ until the content of $CO_2$ is lower than 5%, and providing new gas containing $CO_2$ by the gas storage bin to perform grinding reaction, so as to realize continuous production of the carbon-mineralized slurry.

At step S5, conveying the carbon-mineralized slurry into the mixing machine and mixing with a cement, a mineral admixture, an aggregate, water and a water reducer to obtain a carbon fixation commodity concrete.

In the grinding process of the steps S2 to S4, a feeding rate is 10 to 50 L/min, a stay time in the grinding bin is not greater than 40 min, a grinding rate is 150 to 1000 r/min, and a ball-material ratio of the medium balls to the composite slurry is 1:1 to 5:1.

Furthermore, a solid-liquid ratio of the composite slurry is 3:1 to 3:17, and a fluidity is 160 to 280 mm.

The solid waste comprises at least one of steel slag, blast furnace slag, high calcium fly ash, electric furnace slag, carbide slag, magnesium slag, biomass ash, cement kiln dust, municipal waste incineration ash, and construction waste micropowder, and a total mass ratio of CaO, MgO and FeO in the solid waste is ≥10%.

The natural ore comprises at least one of wollastonite, olivine, serpentine, talcum, pyroxene and feldspar.

A $CO_2$ content of the gas containing $CO_2$ is ≥30%, concentrations of $NO_x$ and $SO_2$ are ≤400 mg/m$^3$ and ≤200 mg/m$^3$ respectively, and a conveying rate of carbon dioxide is 200 to 1000 L/min; when a pressure of the gas storage bin is 0.18 MPa, the gas containing $CO_2$ is conveyed, and when the pressure of the gas storage bin is ≥0.25 MPa, the conveying of the gas containing $CO_2$ is stopped.

A ratio of a content of the industrial aid to a solid mass of the composite slurry is 0.01 to 0.2%, and the industrial aid comprises at least one of a dispersing agent, a defoaming agent, a suspending agent, a neutralizing agent, a chelating agent, a solubilizing agent and a nucleating agent.

A mean particle size of the carbon-mineralized slurry is ≤20 μm, a carbonization reaction degree is 10 to 80%, and a solid-liquid ratio is 4:1 to 2:11.

A comprehensive power consumption of continuous production of the carbon-mineralized slurry is 12 to 80 kW·h.

In some embodiments of the present disclosure, the dispersing agent may be selected as at least one of benzenesulfonic acid formaldehyde complex, benzenesulfonic acid formaldehyde condensation compound, and coumarone resin sodium sulfonate.

In some embodiments of the present disclosure, the defoaming agent includes at least one of polyoxypropylene polyoxyethylene propylene glycol ether, polyoxypropylene polyoxyethylene propyl glycerol ether and polyoxypropylene polyoxyethylene monobutyl ether.

In some embodiments of the present disclosure, the suspending agent includes at least one of cellulose, lignin, polyacrylic acid and their salts and the like.

In some embodiments of the present disclosure, the neutralizing agent includes at least one of phosphoric acid, soluble phosphate, glycine, sulfamic acid and the like.

In some embodiments of the present disclosure, the chelating agent includes at least one of ethylene diamine tetraacetic acid, ethylene diamine tetraacetic acid disodium, and phytic acid and the like.

In some embodiments of the present disclosure, the solubilizing agent includes at least one of polyethyleneimine, polypropyleneimine, nitratoethanolamine and the like.

In some embodiments of the present disclosure, the nucleating agent includes at least one of monoethanolamine, diethanolamine, and triethanolamine and the like.

Furthermore, when the solid waste is at least one of steel slag, carbide slag, magnesium slag, construction waste micropowder, biomass ash, cement kiln dust and municipal waste incineration ash, an absolute dry mass ratio of the concrete mixing plant waste slurry to the solid waste to the natural ore is 1:15 to 65:0 to 20.

When the solid waste is at least one of blast furnace slag, high calcium fly ash and electric furnace slag, an absolute dry mass ratio of the concrete mixing plant waste slurry to the solid waste to the natural ore is 1:1 to 15:0 to 20.

Furthermore, in the step S5, a mixing sequence is the aggregate, the mineral admixture, the cement, the water, the carbon-mineralized slurry and the water reducer, and a forced mixing time is 10 to 90 s.

The carbon fixation commodity concrete comprises ordinary concrete, underwater concrete, fine aggregate concrete, impermeable concrete and road concrete.

Furthermore, the ordinary concrete comprises, by mass percent, the carbon-mineralized slurry 0.5 to 12.5%, the cement 2.5 to 15%, the mineral admixture 3.5 to 7.5%, the aggregate 70.3 to 83.8%, the water 6.2 to 7.7%, and the water reducer 0.2 to 0.8%.

The underwater concrete comprises, by mass percent, the carbon-mineralized slurry 1.5 to 12.5%, the cement 2.5 to 15%, the mineral admixture 4.5 to 6.0%, the aggregate 71.5 to 75.9%, the water 6.2 to 6.4%, and the water reducer 0.4 to 0.6%, and a mean particle size of the carbon-mineralized slurry in the underwater concrete is not greater than 2 m.

The fine aggregate concrete comprises, by mass percent, the carbon-mineralized slurry 0.5 to 5.6%, the cement 2.5 to 8.1%, the mineral admixture 3.5 to 5.2%, the aggregate 80.1 to 83.8%, the water 6.8 to 7.7%, and the water reducer 0.3 to 0.5%, and a mean particle size of the carbon-mineralized slurry in the fine aggregate concrete is 10 to 20 m.

The impermeable concrete comprises, by mass percent, the carbon-mineralized slurry 0.7 to 11.7%, the cement 4.3 to 14.2%, the mineral admixture 3.6 to 7.5%, the aggregate 70.3 to 83.7%, the water 6.2 to 6.5%, and the water reducer 0.2 to 0.8%, and a mean particle size of the carbon-mineralized slurry in the impermeable concrete is 2 to 5 m.

The road concrete comprises, by mass percent, the carbon-mineralized slurry 0.5 to 5.4%, the cement 2.5 to 7.9%, the mineral admixture 3.5 to 5.3%, the aggregate 80.3 to 83.8%, the water 6.8 to 7.7%, and the water reducer 0.2 to 0.5%, and a mean particle size of the carbon-mineralized slurry in the road concrete is 6 to 10 m.

Compared with the prior arts, the present disclosure has the following beneficial effects.

1. The wet carbonization reaction of the basic solid wastes undergoes five processes: ① the ions such as $Ca^{2+}$ and $Mg^{2+}$ etc. in the solid particles are dissolved out; ② $CO_2$ is dissolved in an aqueous solution to form $CO_3^{2-}$; ③ crystals are precipitated on the particle surface; ④ precipitates are formed in the solution; ⑤ the precipitated particles in the solution are absorbed to the solid surface. Since the solid waste silicon-aluminum-oxygen network structures have high thermodynamic stability, the ions such as $Ca^{2+}$ and $Mg^{2+}$ etc. therein are difficult to dissolve out; the generated calcium carbonate precipitate can further plug the pores and even fully wrap the solid waste particles, and thus the diffusion transportation channels of the ions such as $Ca^{2+}$ and $Mg^{2+}$ etc can be blocked, limiting the carbon fixation efficiency. By a liquid phase grinding mechanical force, the surfaces of the solid waste particles are continuously peeled and the diffusion rate of the $CO_2$ and $Ca^{2+}$ is increased by chemical solubilizing components, so as to fully release the carbonization potential of the solid wastes. A large amount of gas is introduced into to the liquid phase grinding environment to provide hydrodynamic cavitation conditions for rotary mechanical stirring. At the time of collapse of the cavitation bubbles, high-speed microjets and impact waves can be generated, which causes the extreme turbulences and mechanical shear effect to be more favorable for particle refining, and shortens the conventional non-in-situ mineralization reaction from several hours of carbonization to within 40 minutes.

2. The nucleating agent is used to regulate the crystal forms of the carbon-mineralized $CaCO_3$, and limit the growth of $CaCO_3$ under the action of the liquid phase mechanical force. The $CaCO_3$ in place of cement not only has good morphological effect and increases the bending and compression strengths of the concrete but also serves as micro-aggregates to fill the pores and increase the durability.

3. In the process of efficient carbon fixation of the solid wastes, since the solid waste particles are efficiently refined under solid phase medium collision, liquid phase medium chemolysis and gas liquid cavitation impact, the problem of weakness at the interface connections resulting from many corners and irregular morphology of the solid particles is solved and the dissolution of the activating oxides such as active $SiO_2$ and $Al_2O_3$ and the like is increased. The increased surface free energy and reaction activity can accelerate secondary hydration reaction process with calcium hydroxide. It, as concrete admixture, can not only increase the early and later strengths of the cement and lower the cement system alkalinity but also improve the volume stability and durability of the cement.

4. The commodity concrete is one of two trillion-Yuan-scale industries in the construction material field. The amount of concretes used in the projects such as houses, water conservancy, traffic and municipal facilities and the like across the world measures in tens of billions tons, and the change of the concretes used as construction materials in the largest amount across the world into global carbon resources can not only fully play the role of low carbon and carbon reduction of the concrete materials in the engineering construction field but also effectively consume the industrial solid wastes and construction wastes, thus promoting the green sustainable development of various industries.

Figure 1:
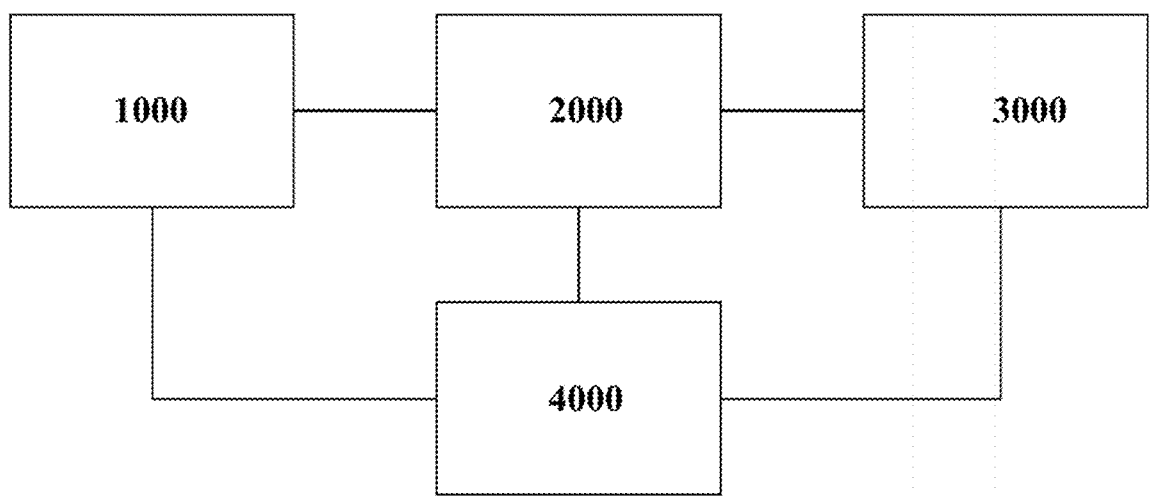
FIG. 1 is a schematic diagram illustrating a system for $CO_2$ storage and utilization of a concrete mixing plant according to an embodiment of the present disclosure.

The numerals of the drawings are described below:
1000. slurry making module, 1100. sand stone separating machine, 1200. sand removing machine, 1300. slurry making machine, 1301. machine body, 1302. slurry outlet, 1303. material-adding opening, 1304. first rotary shaft, 1305. first motor, 1306. rotary blade, 1307. bevel gear, 1308. weight measurement meter, 1309. display, 1310. first electronic valve, 2000. cyclic grinding module, 2100. grinding machine, 2101. cylinder body, 2102. material inlet, 2103. screen, 2104. sealed console, 2105. finished product bin, 2106. grinding bin, 2107. gas pipe, 2108. second motor, 2109. drive rotary rod, 2110. hollow rotary shaft, 2111. centrifugal blade, 2112. gas outlet, 2113. first material outlet, 2114. cooling cylinder, 2115. water inlet, 2116. water outlet, 2117. second electronic valve, 2118. strainer, 2119. third electronic valve, 2120. medium ball, 2200. material discharge component, 2201. slurry inlet, 2202. gas storage bin, 2203. slurry bin, 2204. gas relief opening, 2205. gas pressure meter, 2206. outlet end, 2207. U-shaped pipe, 2208. fourth electronic valve, 2300. $CO_2$ circulating component, 3000. material storage and application module, 3100. material storage bin, 3101. feed pipe, 3102. second material outlet, 3103. rotational shaft, 3104. helical blade, 3200. mixing machine, and 4000. control module.

DESCRIPTION OF THE EMBODIMENTS

The end points and any values in the ranges disclosed in the present disclosure are not limited to the precise ranges or values and these ranges or values should be understood as including the values approaching these ranges or values. For the value ranges, combination may be performed on an interval between end point values of each range, an interval between an endpoint value and a separate point value of each range and an interval between separate point values to obtain one or more new value ranges and these value ranges should be deemed as specifically disclosed in the present disclosure.

The technical solutions of the present disclosure will be fully and clearly described below in combination with the specific embodiments of the present disclosure and the accompanying drawings of the specification. Apparently, the embodiments described herein are only some embodiments of the present disclosure rather than all embodiments. All other embodiments obtained by those skilled in the arts based on these embodiments of the present disclosure without carrying out creative work shall fall within the scope of protection of the present disclosure.

Embodiment 1

With reference to FIGS. 1 to 6, there is provided a system for $CO_2$ storage and utilization of a concrete mixing plant, which includes a slurry making module 1000, a cyclic grinding module 2000, a material storage and application module 3000 and a control module 4000. The slurry making module 1000 is used to mix a concrete mixing plant waste slurry, a natural ore and an industrial aid to produce a composite slurry and convey the composite slurry to the cyclic grinding module 2000. The cyclic grinding module 2000 includes a grinding machine 2100, a material discharge component 2200 and a $CO_2$ circulating component 2300. A mixing element is disposed inside the grinding machine 2100, and the mixing element includes a hollow rotary shaft 2110 and medium balls 2120. The material discharge component 2200 includes a gas storage bin 2202 and a slurry bin 2203 communicated with each other and disposed up and down. The gas storage bin 2202 is connected sequentially with the grinding machine 2100 and the $CO_2$ circulating component 2300. The gas storage bin 2202 is configured to supply a gas containing $CO_2$ to the $CO_2$ circulating component 2300. The $CO_2$ circulating component 2300 is configured to convey the gas to the grinding machine 2100 and recover a tail gas containing $CO_2$ generated during a grinding process of the gas containing $CO_2$ and the medium balls 2120 for the composite slurry in the grinding machine 2100. The grinding machine 2100 is configured to grind and prepare the composite slurry in the presence of the gas containing $CO_2$ and the medium balls 2120 into a carbon-mineralized slurry and convey the carbon-mineralized slurry to the slurry bin 2203 of the material discharge component 2200. The material storage and application module 3000 includes a material storage bin 3100 and a mixing machine 3200 connected with each other, and the material storage bin 3100 is configured to receive and store the carbon-mineralized slurry from the slurry bin 2203, and the mixing machine 3200 is configured to mix and prepare the carbon-mineralized slurry into a commodity concrete. The control module 4000 is configured to control the slurry making module 1000, the cyclic grinding module 2000 and the material storage and application module 3000.

Figure 2:
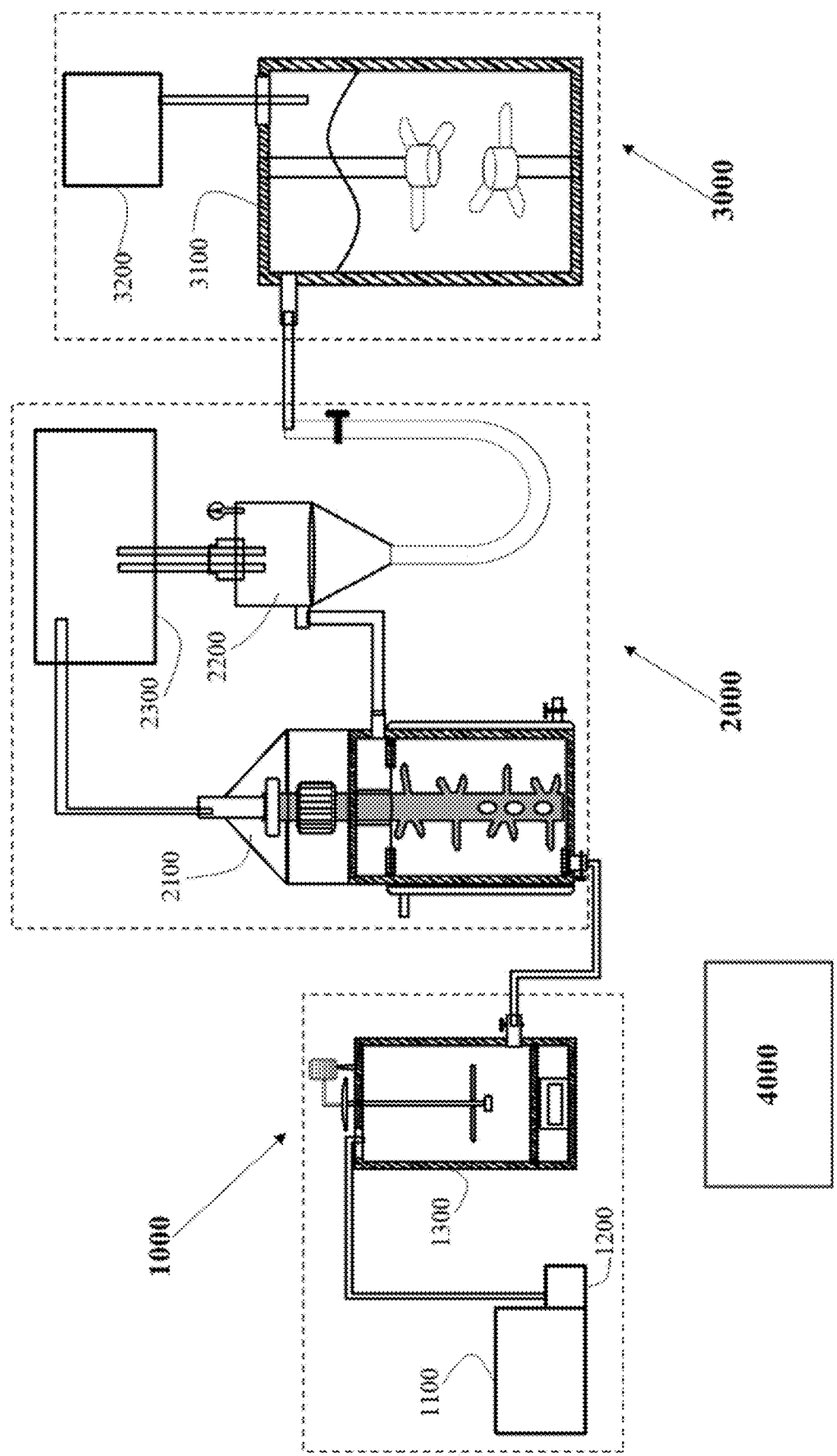
FIG. 2 is a structural schematic diagram illustrating a system for $CO_2$ storage and utilization of a concrete mixing plant according to an embodiment of the present disclosure.
Figure 3:
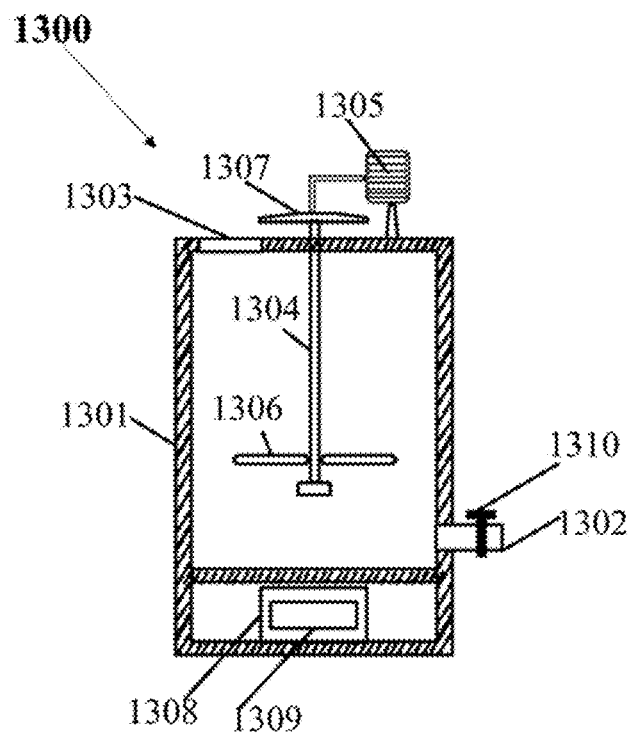
FIG. 3 is a structural schematic diagram illustrating a slurry making machine according to an embodiment of the present disclosure.

With reference to FIG. 2, the slurry making module 1000 includes a sand stone separating machine 1100, a sand removing machine 1200 and a slurry making machine 1300 connected sequentially. With reference to FIG. 3, the slurry making machine 1300 includes a machine body 1301, a slurry outlet 1302 at an outer side of the machine body 1301, a material-adding opening 1303 on a top of the machine body 1301, a first rotary shaft 1304 in a middle of the top of the machine body 1301 and a first motor 1305 on the top of the machine body 1301. Rotary blades 1306 are disposed at a lower end of the first rotary shaft 1304 and extended into the machine body 1301. An upper end of the first rotary shaft 1304 is connected with a drive part of the first motor 1305 through a bevel gear 1307. A weight measurement meter 1308 on which a display 1309 is disposed is further disposed at a bottom of the machine body 1301. A first electronic valve 1310 and a first feed pump are sequentially disposed on the slurry outlet 1302 of the slurry making machine 1300. The sand stone separating machine 1100 and the sand removing machine 1200 are used to perform sand stone separation on a waste slurry liquid produced in the processes such as waste concrete separation, equipment washing and site cleaning of production area and the like in a pre-mixed concrete manufacturer so as to obtain a mixed liquid containing more solid particles as a concrete mixing plant waste slurry.

Figure 4:
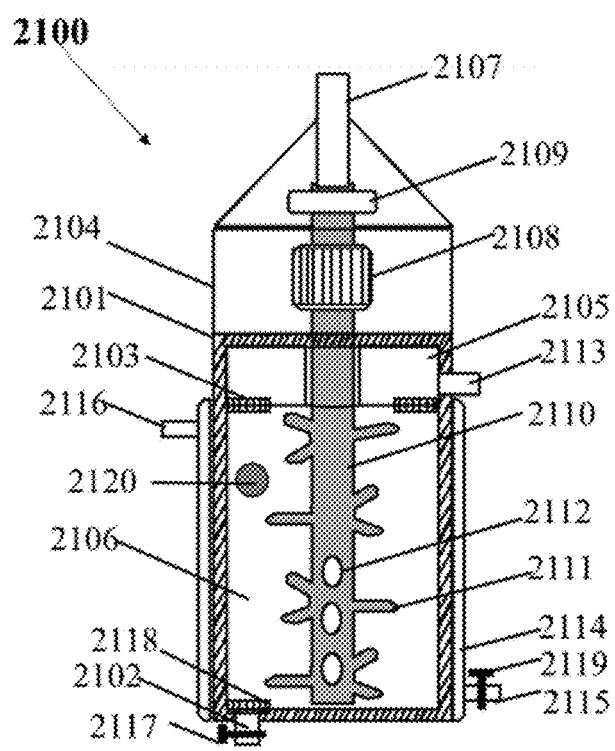
FIG. 4 is a structural schematic diagram illustrating a grinding machine according to an embodiment of the present disclosure.

With reference to FIG. 4, the grinding machine 2100 includes a cylinder body 2101, a material inlet 2102 at a bottom of the cylinder body 2101, a screen 2103 in the cylinder body 2101, a sealed console 2104 on a top of the cylinder body 2101 and the mixing element in the sealed console 2104. The material inlet 2102 is connected with the slurry outlet 1302 of the slurry making machine 1300. The screen 2103 divides an interior of the cylinder body 2101 into an above-screen 2103 finished product bin 2105 and an under-screen 2103 grinding bin 2106. The medium balls 2120 are located in the grinding bin 2106, and a gas inlet provided with a gas pipe 2107 is opened on a top of the sealed console 2104. The mixing element further includes a second motor 2108 and a drive rotary rod 2109, and an output end of the second motor 2108 is fixedly connected with the drive rotary rod 2109. The drive rotary rod 2109 is fixedly connected with the hollow rotary shaft 2110, and a top of the hollow rotary shaft 2110 is connected with the gas pipe 2107. A lower end of the hollow rotary shaft 2110 extends to the grinding bin 2106. Centrifugal blades 2111 and uniformly-distributed gas outlets 2112 are disposed on the hollow rotary shaft 2110 in the grinding bin 2106. A first material outlet 2113 is disposed at an outer side of the finished product bin 2105. In order to control a temperature of the cylinder body, a cooling cylinder 2114 is disposed outside the cylinder body 2101, and a lower part and an upper part of the cooling cylinder 2114 are respectively provided with a water inlet 2115 and a water outlet 2116, so as to achieve temperature control through circulating water. A second electronic valve 2117 and a strainer 2118 are sequentially disposed on the material inlet 2102 of the grinding machine 2100, and the water inlet 2115 of the cooling cylinder 2114 is provided with a third electronic valve 2119. An inner bottom of the finished product bin 2105 of the grinding machine 2100 has an angle of inclination of 5 to 15°.

Figure 5:
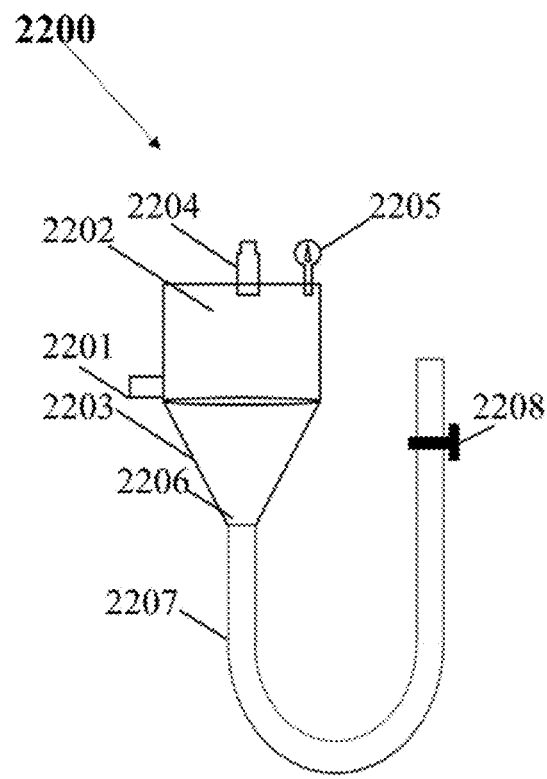
FIG. 5 is a structural schematic diagram illustrating a material discharge component according to an embodiment of the present disclosure.

With reference to FIG. 5, a slurry inlet 2201 is disposed at a side of the gas storage bin 2202 of the material discharge component 2200, the slurry inlet 2201 is connected with the first material outlet 2113 of the finished product bin 2105, and a gas relief opening 2204 and a gas pressure meter 2205 are disposed on a top of the gas storage bin 2202. The $CO_2$ circulating component 2300 is provided with a circulating gas inlet and a circulating gas outlet, the gas relief opening 2204 of the gas storage bin 2202 is connected with the circulating gas inlet of the $CO_2$ circulating component 2300, and the circulating gas outlet of the $CO_2$ circulating component 2300 is connected with the gas inlet of the grinding machine 2100. An outlet end 2206 of the slurry bin 2203 of the material discharge component 2200 is connected with a U-shaped pipe 2207. A fourth electronic valve 2208 and a second feed pump are sequentially disposed on the U-shaped pipe 2207. The gas storage bin 2202 can capture $CO_2$ (gas) from the atmosphere environment and store it or be connected with another equipment of gas containing $CO_2$.

Figure 6:
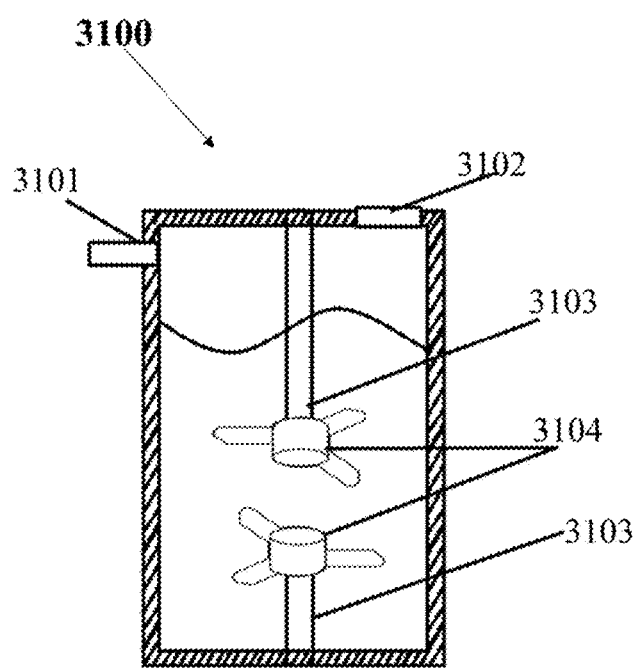
FIG. 6 is a structural schematic diagram illustrating a material storage bin according to an embodiment of the present disclosure.

With reference to FIG. 6, a feed pipe 3101 connected with the U-shaped pipe 2207 is disposed at an upper end of an outer side of the material storage bin 3100, and a second material outlet 3102 connected with the mixing machine 3200 is disposed on a top of the material storage bin 3100. The second material outlet 3102 is provided with a third feed pump. A rotary bearing is disposed on an upper end and a lower end of an interior of the material storage bin 3100 respectively, the rotary bearing is connected with a rotational shaft 3103, and an end of the rotational shaft 3103 away from the rotary bearing is provided with helical blades 3104.

The control module 4000 is electrically connected with the first electronic valve 1310, the second electronic valve 2117, the third electronic valve 2119, the fourth electronic valve 2208, the first feed pump, the second feed pump, the third feed pump, the first motor 1305, the second motor 2108, the $CO_2$ circulating component 2300, the sand stone separating machine 1100 and the sand removing machine 1200 respectively. The control module 4000 is selected as PLC.

Figure 7:
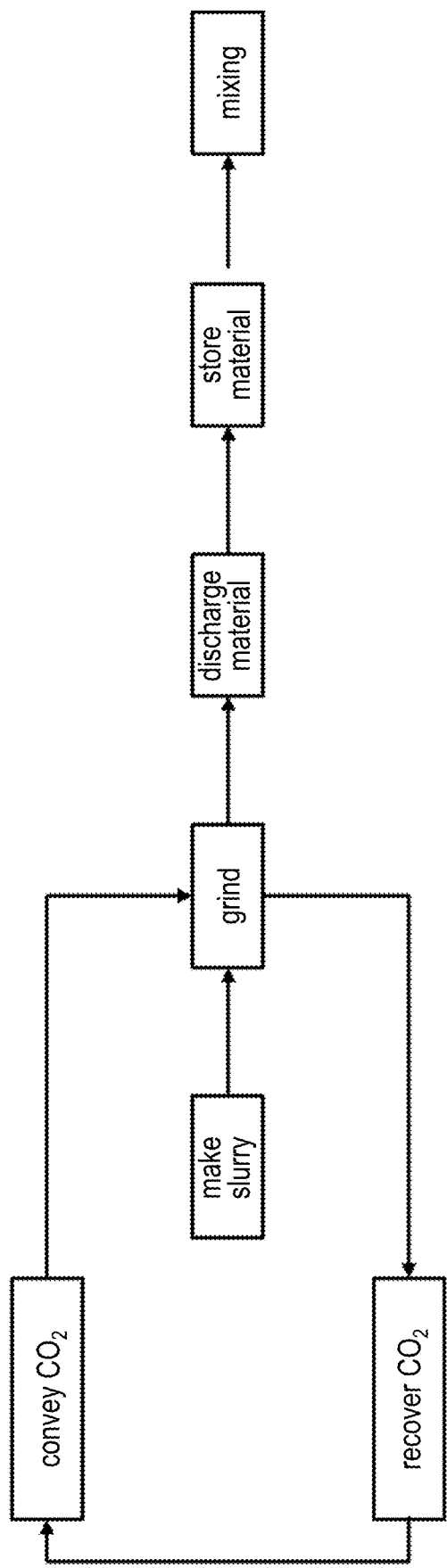
FIG. 7 is a principle diagram illustrating a system for $CO_2$ storage and utilization of a concrete mixing plant according to an embodiment of the present disclosure.

FIG. 7 is a principle diagram illustrating a system for $CO_2$ storage and utilization of a concrete mixing plant.

The method embodiments use the system for $CO_2$ storage and utilization of the concrete mixing plant in the embodiment 1. In use of the system, when the pressure of the gas storage bin 2202 is equal to 0.18 MPa, the gas relief opening 2204 is opened, and the $CO_2$ circulating component 2300 conveys a gas containing $CO_2$ to the grinding machine 2100. When the pressure of the gas storage bin 2202 is greater than 0.25 MPa, the $CO_2$ circulating component 2300 stops conveying the gas containing $CO_2$. The pre-mixed concrete manufacturer performs, by using the sand stone separating machine 1100 and the sand removing machine 1200, treatment on a waste slurry liquid generated in the processes such as waste concrete separation, equipment washing and site cleaning of production area and the like so as to obtain the concrete mixing plant waste slurry. The masses of the concrete mixing plant waste slurry and the carbon-mineralized slurry each refer to an absolute dry mass, and the total mass ratio of CaO, MgO and FeO in the solid waste is ≥10%. These contents will not be repeated herein.

Embodiment 2

There is a method of $CO_2$ storage and utilization of a concrete mixing plant, which includes the following steps.

At step S1, 1 mass part of concrete mixing plant waste slurry, 65 mass parts of solid waste and 0.132 mass parts of industrial aid are mixed in the slurry making machine to obtain a composite slurry, where the solid-liquid ratio of the composite slurry is 3:1 and the fluidity is 160 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 2 m, a carbonization reaction degree is 80%, a solid-liquid ratio is 10:3, and the comprehensive power consumption is 60 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 2.0%, the cement 11.4%, the mineral admixture 5.4%, the aggregate 73.9%, the water 6.7% and the water reducer 0.6%.

In the step S1, the solid waste is carbide slag, the industrial aid is a mixture obtained by mixing a dispersing agent, a defoaming agent and a suspending agent at a mass ratio of 1:0.1:0.1. The dispersing agent is obtained by mixing benzenesulfonic acid formaldehyde complex and coumarone resin sodium sulfonate at a mass ratio of 1:3, the defoaming agent is polyoxypropylene polyoxyethylene propyl glycerol ether, and the suspending agent is lignin. In the steps S2 to S4, the feeding rate of the grinding process is 10 L/min, the grinding stay time is 40 min, and the grinding rate is 1000 r/min. There are medium balls in the grinding bin of the grinding machine, and a ball-material ratio of the medium balls to the composite slurry is 1:1. In the step S3, the gas containing $CO_2$ has a conveying rate of 400 L/min and a purity of 99.99%.

Embodiment 3

There is a method of $CO_2$ storage and utilization of a concrete mixing plant, which includes the following steps.

At step S1, 1 mass part of concrete mixing plant waste slurry, 65 mass parts of solid waste, 20 mass parts of natural ore, and 0.172 mass parts of industrial aid are mixed in the slurry making machine to obtain a composite slurry, where the solid-liquid ratio of the composite slurry is 3:1 and the fluidity is 160 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 4 μm, a carbonization reaction degree is 65%, a solid-liquid ratio is 4:1, and the comprehensive power consumption is 80 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 12.5%, the cement 2.7%, the mineral admixture 3.5%, the aggregate 74.0%, the water 6.7% and the water reducer 0.6%.

In the step S1, the solid waste is steel slag, the natural ore is wollastonite, the industrial aid is a mixture obtained by mixing a dispersing agent, a defoaming agent and a suspending agent at a mass ratio of 1:0.1:0.1. The dispersing agent is obtained by mixing benzenesulfonic acid formaldehyde complex and coumarone resin sodium sulfonate at a mass ratio of 2:5, the defoaming agent is polyoxypropylene polyoxyethylene propylene glycol ether, and the suspending agent is obtained by mixing cellulose and lignin at a mass ratio of 1:2. In the steps S2 to S4, the feeding rate of the grinding process is 10 L/min, the grinding stay time is 40 min, and the grinding rate is 1000 r/min. There are medium balls in the grinding bin of the grinding machine, and a ball-material ratio of the medium balls to the composite slurry is 1:1. In the step S3, the gas containing $CO_2$ has a conveying rate of 1000 L/min and a purity of 99.99%.

Embodiment 4

There is a method of $CO_2$ storage and utilization of a concrete mixing plant, which includes the following steps.

At step S1, 1 mass part of concrete mixing plant waste slurry, 55 mass parts of solid waste, 15 mass parts of natural ore, and 0.106 mass parts of industrial aid are mixed in the slurry making machine to obtain a composite slurry, where the solid-liquid ratio of the composite slurry is 1:1 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 2 μm, a carbonization reaction degree is 80%, a solid-liquid ratio is 10:3, and the comprehensive power consumption is 60 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 2.0%, the cement 2.5%, the mineral admixture 3.8%, the aggregate 83.0%, the water 7.7% and the water reducer 0.2%.

In the step S1, the solid waste is a mixture obtained by mixing steel slag and carbide slag at a mass ratio of 1:1, the natural ore is a mixture obtained by mixing wollastonite and olivine at a mass ratio of 1:1, and the industrial aid is a mixture obtained by mixing a dispersing agent, a defoaming agent and a suspending agent at a mass ratio of 1:0.1:0.1. The dispersing agent is obtained by mixing benzenesulfonic acid formaldehyde complex and coumarone resin sodium sulfonate at a mass ratio of 1:5, the defoaming agent is polyoxypropylene polyoxyethylene monobutyl ether, and the suspending agent is obtained by mixing lignin and polyacrylic acid at a mass ratio of 2:3. In the steps S2 to S4, the feeding rate of the grinding process is 20 L/min, the grinding stay time is 10 min, and the grinding rate is 800 r/min. There are medium balls in the grinding bin of the grinding machine, and a ball-material ratio of the medium balls to the composite slurry is 6:5. In the step S3, the gas containing $CO_2$ has a conveying rate of 400 L/min and a purity of 99.99%.

Embodiment 5

There is a method of $CO_2$ storage and utilization of a concrete mixing plant, which includes the following steps.

At step S1, 1 mass part of concrete mixing plant waste slurry, 45 mass parts of solid waste, 10 mass parts of natural ore, and 0.056 mass parts of industrial aid are mixed in the slurry making machine to obtain a composite slurry, where the solid-liquid ratio of the composite slurry is 1:2 and the fluidity is 240 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8 m, a carbonization reaction degree is 35%, a solid-liquid ratio is 3:5, and the comprehensive power consumption is 18 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 1.0%, the cement 5.0%, the mineral admixture 4.0%, the aggregate 83.0%, the water 6.8% and the water reducer 0.2%.

In the step S1, the solid waste is a mixture obtained by mixing steel slag, construction waste micropowder and magnesium slag at a mass ratio of 1:1:0.5, the natural ore is a mixture obtained by mixing wollastonite and talcum at a mass ratio of 1:1, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is cellulose. In the steps S2 to S4, the feeding rate of the grinding process is 30 L/min, the grinding stay time is 10 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 600 L/min and a purity of 99.99%.

Embodiment 6

There is a method of $CO_2$ storage and utilization of a concrete mixing plant, which includes the following steps.

At step S1, 1 mass part of concrete mixing plant waste slurry, 30 mass parts of solid waste, 5 mass parts of natural ore, and 0.018 mass parts of industrial aid are mixed in the slurry making machine to obtain a composite slurry, where the solid-liquid ratio of the composite slurry is 1:3 and the fluidity is 240 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8 μm, a carbonization reaction degree is 20%, a solid-liquid ratio is 2:5, and the comprehensive power consumption is 16 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 0.5%, the cement 5.7%, the mineral admixture 5.1%, the aggregate 82.0%, the water 6.4% and the water reducer 0.3%.

In the step S1, the solid waste is a mixture obtained by mixing steel slag, construction waste micropowder and magnesium slag at a mass ratio of 1:1:0.5, the natural ore is a mixture obtained by mixing wollastonite and talcum at a mass ratio of 1:1, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is cellulose. In the steps S2 to S4, the feeding rate of the grinding process is 40 L/min, the grinding stay time is 10 min, and the grinding rate is 400 r/min. There are medium balls in the grinding bin of the grinding machine, and a ball-material ratio of the medium balls to the composite slurry is 4:1. In the step S3, the gas containing $CO_2$ has a conveying rate of 800 L/min and a purity of 99.99%.

Embodiment 7

There is a method of $CO_2$ storage and utilization of a concrete mixing plant, which includes the following steps.

At step S1, 1 mass part of concrete mixing plant waste slurry, 15 mass parts of solid waste, and 0.008 mass parts of industrial aid are mixed in the slurry making machine to obtain a composite slurry, where the solid-liquid ratio of the composite slurry is 1:4 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8 μm, a carbonization reaction degree is 40%, a solid-liquid ratio is 3:10, and the comprehensive power consumption is 16 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 0.5%, the cement 8.4%, the mineral admixture 5.6%, the aggregate 78.5%, the water 6.7% and the water reducer 0.3%.

In the step S1, the solid waste is a mixture obtained by mixing steel slag, construction waste micropowder and biomass ash at a mass ratio of 1:1:0.5, and the industrial aid is a mixture obtained by mixing a dispersing agent, a defoaming agent and a suspending agent at a mass ratio of 1:0.1:0.1. The dispersing agent is benzenesulfonic acid formaldehyde complex, the defoaming agent is polyoxypropylene polyoxyethylene monobutyl ether, and the suspending agent is lignin. In the steps S2 to S4, the feeding rate of the grinding process is 50 L/min, the grinding stay time is 10 min, and the grinding rate is 150 r/min. There are medium balls in the grinding bin of the grinding machine, and a ball-material ratio of the medium balls to the composite slurry is 5:1. In the step S3, the gas containing $CO_2$ has a conveying rate of 800 L/min and a purity of 99.99%.

Embodiment 8

There is a method of $CO_2$ storage and utilization of a concrete mixing plant, which includes the following steps.

At step S1, 1 mass part of concrete mixing plant waste slurry, 30 mass parts of solid waste, 5 mass parts of natural ore and 0.018 mass parts of industrial aid are mixed in the slurry making machine to obtain a composite slurry, where the solid-liquid ratio of the composite slurry is 3:17 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8

µm, a carbonization reaction degree is 10%, a solid-liquid ratio is 2:11, and the comprehensive power consumption is 16 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 0.5%, the cement 9.1%, the mineral admixture 6.3%, the aggregate 77.1%, the water 6.7% and the water reducer 0.3%.

In the step S1, the solid waste is a mixture obtained by mixing construction waste micropowder and kiln dust at a mass ratio of 1:1, the natural ore is a mixture obtained by mixing wollastonite, olivine and pyroxene at a mass ratio of 1:1:1, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is sodium polyacrylate. In the steps S2 to S4, the feeding rate of the grinding process is 50 L/min, the grinding stay time is 10 min, and the grinding rate is 400 r/min. There are medium balls in the grinding bin of the grinding machine, and a ball-material ratio of the medium balls to the composite slurry is 3:1. In the step S3, the gas containing $CO_2$ has a conveying rate of 600 L/min and a purity of 99.99%.

Embodiment 9

There is a method of $CO_2$ storage and utilization of a concrete mixing plant, which includes the following steps.

At step S1, 1 mass part of concrete mixing plant waste slurry, 30 mass parts of solid waste, 5 mass parts of natural ore and 0.018 mass parts of industrial aid are mixed in the slurry making machine to obtain a composite slurry, where the solid-liquid ratio of the composite slurry is 1:2 and the fluidity is 240 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 6 m, a carbonization reaction degree is 25%, a solid-liquid ratio is 2:3, and the comprehensive power consumption is 12 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 1.0%, the cement 10.1%, the mineral admixture 6.4%, the aggregate 75.4%, the water 6.7% and the water reducer 0.4%.

In the step S1, the solid waste is a mixture obtained by mixing construction waste micropowder and municipal waste incineration ash at a mass ratio of 1:1, the natural ore is a mixture obtained by mixing wollastonite, olivine, pyroxene and feldspar at a mass ratio of 1:1:1:1, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is cellulose. In the steps S2 to S4, the feeding rate of the grinding process is 50 L/min, the grinding stay time is 10 min, and the grinding rate is 400 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 10

There is a method of $CO_2$ storage and utilization of a concrete mixing plant, which includes the following steps.

At step S1, 1 mass part of concrete mixing plant waste slurry, 15 mass parts of solid waste, 20 mass parts of natural ore and 0.054 mass parts of industrial aid are mixed in the slurry making machine to obtain a composite slurry, where the solid-liquid ratio of the composite slurry is 3:17 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 3 µm, a carbonization reaction degree is 50%, a solid-liquid ratio is 5:24, and the comprehensive power consumption is 80 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 0.5%, the cement 11.3%, the mineral admixture 6.9%, the aggregate 74.1%, the water 6.7% and the water reducer 0.5%.

In the step S1, the solid waste is blast furnace slag, the natural ore is wollastonite, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is cellulose. In the steps S2 to S4, the feeding rate of the grinding process is 20 L/min, the grinding stay time is 40 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 11

There is a method of $CO_2$ storage and utilization of a concrete mixing plant, which includes the following steps.

At step S1, 1 mass part of concrete mixing plant waste slurry, 15 mass parts of solid waste, 20 mass parts of natural ore and 0.054 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 6 μm, a carbonization reaction degree is 25%, a solid-liquid ratio is 7:13, and the comprehensive power consumption is 48 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 0.5%, the cement 15.0%, the mineral admixture 7.5%, the aggregate 70.3%, the water 6.2% and the water reducer 0.5%.

In the step S1, the solid waste is high calcium fly ash, the natural ore is a mixture obtained by mixing wollastonite and olivine at a mass ratio of 1:1, and the industrial aid is a mixture obtained by mixing a dispersing agent, a defoaming agent, a suspending agent, a chelating agent, and a solubilizing agent at a mass ratio of 1:0.1:0.1:0.2:0.2. The dispersing agent is benzenesulfonic acid formaldehyde condensation compound, the defoaming agent is polyoxypropylene polyoxyethylene propyl glycerol ether, the suspending agent is cellulose, the chelating agent is ethylene diamine tetraacetic acid disodium, and the solubilizing agent is polypropyleneimine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 12

There is a method of $CO_2$ storage and utilization of a concrete mixing plant, which includes the following steps.

At step S1, 1 mass part of concrete mixing plant waste slurry, 15 mass parts of solid waste, 20 mass parts of natural ore and 0.054 mass parts of industrial aid are mixed in the slurry making machine to obtain a composite slurry, where the solid-liquid ratio of the composite slurry is 2:1 and the fluidity is 180 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 2 μm, a carbonization reaction degree is 80%, a solid-liquid ratio is 10:3, and the comprehensive power consumption is 60 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 10.2%, the cement 4.0%, the mineral admixture 6.5%, the aggregate 72.4%, the water 6.3% and the water reducer 0.6%.

In the step S1, the solid waste is electric furnace slag, the natural ore is a mixture obtained by mixing wollastonite and serpentine at a mass ratio of 1:1, and the industrial aid is a mixture obtained by mixing a dispersing agent, a defoaming agent, a suspending agent, a chelating agent, and a solubilizing agent at a mass ratio of 1:0.1:0.1:0.2:0.2. The dispersing agent is benzenesulfonic acid formaldehyde condensation compound, the defoaming agent is polyoxypropylene polyoxyethylene propyl glycerol ether, the suspending agent is cellulose, the chelating agent is ethylene diamine tetraacetic acid disodium, and the solubilizing agent is polypropyleneimine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 13

There is a method of $CO_2$ storage and utilization of a concrete mixing plant, which includes the following steps.

At step S1, 1 mass part of concrete mixing plant waste slurry, 10 mass parts of solid waste, 10 mass parts of natural ore and 0.021 mass parts of industrial aid are mixed in the slurry making machine to obtain a composite slurry, where the solid-liquid ratio of the composite slurry is 1:1 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 6 μm, a carbonization reaction degree is 30%, a solid-liquid ratio is 2:1, and the comprehensive power consumption is 45 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 6.0%, the cement 6.3%, the mineral admixture 6.4%, the aggregate 74.1%, the water 6.7% and the water reducer 0.5%.

In the step S1, the solid waste is a mixture obtained by mixing blast furnace slag and high calcium fly ash at a mass ratio of 1:1, and the industrial aid is a mixture obtained by mixing a dispersing agent, a defoaming agent, a suspending agent, a chelating agent, and a solubilizing agent at a mass ratio of 1:0.1:0.1:0.2:0.2. The dispersing agent is coumarone resin sodium sulfonate, the defoaming agent is polyoxypropylene polyoxyethylene monobutyl ether, the suspending agent is polyacrylic acid, the chelating agent is ethylene diamine tetraacetic acid, and the solubilizing agent is nitratoethanolamine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 14

There is a method of $CO_2$ storage and utilization of a concrete mixing plant, which includes the following steps.

At step S1, 1 mass part of concrete mixing plant waste slurry, 15 mass parts of solid waste, and 0.016 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 6 μm, a carbonization reaction degree is 30%, a solid-liquid ratio is 7:13, and the comprehensive power consumption is 38 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 1.0%, the cement 10.1%, the mineral admixture 6.4%, the aggregate 75.4%, the water 6.7% and the water reducer 0.4%.

In the step S1, the solid waste is a mixture obtained by mixing blast furnace slag, high calcium fly ash and electric furnace slag at a mass ratio of 1:1:1, and the industrial aid is a mixture obtained by mixing a dispersing agent, a defoaming agent, a suspending agent, a chelating agent, and a solubilizing agent at a mass ratio of 1:0.1:0.1:0.2:0.2. The dispersing agent is coumarone resin sodium sulfonate, the defoaming agent is polyoxypropylene polyoxyethylene monobutyl ether, the suspending agent is polyacrylic acid, the chelating agent is ethylene diamine tetraacetic acid, and the solubilizing agent is nitratoethanolamine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 15

There is a method of $CO_2$ storage and utilization of a concrete mixing plant, which includes the following steps.

At step S1, 1 mass part of concrete mixing plant waste slurry, 15 mass parts of solid waste, and 0.016 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 6 μm, a carbonization reaction degree is 40%, a solid-liquid ratio is 3:5, and the comprehensive power consumption is 36 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an ordinary concrete, where the ordinary concrete, by mass percent, includes the carbon-mineralized slurry 1.0%, the cement 14.2%, the mineral admixture 6.7%, the aggregate 71.0%, the water 6.3% and the water reducer 0.8%.

In the step S1, the solid waste is a mixture obtained by mixing blast furnace slag and steel slag at a mass ratio of 1:1, and the industrial aid is a mixture obtained by mixing a dispersing agent, a defoaming agent, a suspending agent, a neutralizing agent, a chelating agent, and a solubilizing agent at a mass ratio of 1:0.1:0.1:0.2:0.2:0.2. The dispersing agent is coumarone resin sodium sulfonate, the defoaming agent is polyoxypropylene polyoxyethylene monobutyl ether, the suspending agent is polyacrylic acid, neutralizing agent is sulfamic acid, the chelating agent is ethylene diamine tetraacetic acid, and the solubilizing agent is nitratoethanolamine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 16

There is a method of $CO_2$ storage and utilization of a concrete mixing plant, which includes the following steps.

At step S1, 1 mass part of concrete mixing plant waste slurry, 15 mass parts of solid waste, and 0.016 mass parts of industrial aid are mixed in the slurry making machine to obtain a composite slurry, where the solid-liquid ratio of the composite slurry is 1:2 and the fluidity is 160 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 1 μm, a carbonization reaction degree is 65%, a solid-liquid ratio is 3:5, and the comprehensive power consumption is 80 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an underwater concrete, where the underwater concrete, by mass percent, includes the carbon-mineralized slurry 1.5%, the cement 10.0%, the mineral admixture 6.0%, the aggregate 75.9%, the water 6.2% and the water reducer 0.4%.

In the step S1, the solid waste is a mixture obtained by mixing blast furnace slag and steel slag at a mass ratio of 1:1, and the industrial aid is a mixture obtained by mixing a dispersing agent, a defoaming agent, a suspending agent and a neutralizing agent at a mass ratio of 1:0.1:0.1:0.2. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propyl glycerol ether, the suspending agent is lignin, and the neutralizing agent is glycine. In the steps S2 to S4, the feeding rate of the grinding process is 20 L/min, the grinding stay time is 40 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 17

There is a method of $CO_2$ storage and utilization of a concrete mixing plant, which includes the following steps.

At step S1, 1 mass part of concrete mixing plant waste slurry, 15 mass parts of solid waste, and 0.016 mass parts of industrial aid are mixed in the slurry making machine to obtain a composite slurry, where the solid-liquid ratio of the composite slurry is 1:2 and the fluidity is 160 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 1 μm, a carbonization reaction degree is 65%, a solid-liquid ratio is 3:5, and the comprehensive power consumption is 80 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an underwater concrete, where the underwater concrete, by mass percent, includes the carbon-mineralized slurry 1.8%, the cement 13.4%, the mineral admixture 5.0%, the aggregate 73.0%, the water 6.3% and the water reducer 0.5%.

In the step S1, the solid waste is a mixture obtained by mixing blast furnace slag and steel slag at a mass ratio of 1:1, and the industrial aid is a mixture obtained by mixing a dispersing agent, a defoaming agent, a suspending agent and a neutralizing agent at a mass ratio of 1:0.1:0.1:0.2. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene monobutyl ether, the suspending agent is lignin, and the neutralizing agent is glycine. In the steps S2 to S4, the feeding rate of the grinding process is 20 L/min, the grinding stay time is 40 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 18

There is a method of $CO_2$ storage and utilization of a concrete mixing plant, which includes the following steps.

At step S1, 1 mass part of concrete mixing plant waste slurry, 15 mass parts of solid waste, and 0.016 mass parts of industrial aid are mixed in the slurry making machine to obtain a composite slurry, where the solid-liquid ratio of the composite slurry is 1:2 and the fluidity is 160 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 1 µm, a carbonization reaction degree is 65%, a solid-liquid ratio is 3:5, and the comprehensive power consumption is 80 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an underwater concrete, where the underwater concrete, by mass percent, includes the carbon-mineralized slurry 2.0%, the cement 15.0%, the mineral admixture 4.5%, the aggregate 71.5%, the water 6.4% and the water reducer 0.6%.

In the step S1, the solid waste is a mixture obtained by mixing blast furnace slag and steel slag at a mass ratio of 1:1, and the industrial aid is a mixture obtained by mixing a dispersing agent, a defoaming agent, a suspending agent and a neutralizing agent at a mass ratio of 1:0.1:0.1:0.2. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propylene glycol ether, the suspending agent is lignin, and the neutralizing agent is glycine. In the steps S2 to S4, the feeding rate of the grinding process is 20 L/min, the grinding stay time is 40 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 19

There is a method of $CO_2$ storage and utilization of a concrete mixing plant, which includes the following steps.

At step S1, 1 mass part of concrete mixing plant waste slurry, 30 mass parts of solid waste, and 0.0155 mass parts of industrial aid are mixed in the slurry making machine to obtain a composite slurry, where the solid-liquid ratio of the composite slurry is 1:3 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 10 µm, a carbonization reaction degree is 35%, a solid-liquid ratio is 11:10, and the comprehensive power consumption is 20 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain a fine aggregate concrete, where the fine aggregate concrete, by mass percent, includes the carbon-mineralized slurry 0.5%, the cement 2.5%, the mineral admixture 5.2%, the aggregate 83.8%, the water 7.7% and the water reducer 0.3%.

In the step S1, the solid waste is carbide slag, and the industrial aid is a mixture obtained by mixing a dispersing agent, a defoaming agent, and a suspending agent at a mass ratio of 1:0.1:0.1. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propyl glycerol ether, and the suspending agent is lignin. In the steps S2 to S4, the feeding rate of the grinding process is 20 L/min, the grinding stay time is 10 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 20

There is a method of $CO_2$ storage and utilization of a concrete mixing plant, which includes the following steps.

At step S1, 1 mass part of concrete mixing plant waste slurry, 30 mass parts of solid waste, and 0.0155 mass parts of industrial aid are mixed in the slurry making machine to obtain a composite slurry, where the solid-liquid ratio of the composite slurry is 1:3 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 15 μm, a carbonization reaction degree is 20%, a solid-liquid ratio is 13:25, and the comprehensive power consumption is 20 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain a fine aggregate concrete, where the fine aggregate concrete, by mass percent, includes the carbon-mineralized slurry 0.8%, the cement 5.6%, the mineral admixture 4.5%, the aggregate 81.2%, the water 7.5% and the water reducer 0.4%.

In the step S1, the solid waste is steel slag, and the industrial aid is a mixture obtained by mixing a dispersing agent, a defoaming agent, and a suspending agent at a mass ratio of 1:0.1:0.1. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propylene glycol ether, and the suspending agent is lignin. In the steps S2 to S4, the feeding rate of the grinding process is 20 L/min, the grinding stay time is 10 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 21

There is a method of $CO_2$ storage and utilization of a concrete mixing plant, which includes the following steps.

At step S1, 1 mass part of concrete mixing plant waste slurry, 30 mass parts of solid waste, and 0.0155 mass parts of industrial aid are mixed in the slurry making machine to obtain a composite slurry, where the solid-liquid ratio of the composite slurry is 1:3 and the fluidity is 280 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 20 μm, a carbonization reaction degree is 25%, a solid-liquid ratio is 13:25, and the comprehensive power consumption is 18 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain a fine aggregate concrete, where the fine aggregate concrete, by mass percent, includes the carbon-mineralized slurry 1.0%, the cement 8.1%, the mineral admixture 3.5%, the aggregate 80.1%, the water 6.8% and the water reducer 0.5%.

In the step S1, the solid waste is a mixture obtained by mixing steel slag and carbide slag at a mass ratio of 1:1, and the industrial aid is a mixture obtained by mixing a dispersing agent, a defoaming agent, and a suspending agent at a mass ratio of 1:0.1:0.1. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene monobutyl ether, and the suspending agent is cellulose. In the steps S2 to S4, the feeding rate of the grinding process is 20 L/min, the grinding stay time is 10 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 22

There is a method of $CO_2$ storage and utilization of a concrete mixing plant, which includes the following steps.

At step S1, 1 mass part of concrete mixing plant waste slurry, 15 mass parts of solid waste, and 0.032 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 4 μm, a carbonization reaction degree is 40%, a solid-liquid ratio is 3:5, and the comprehensive power consumption is 65 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an impermeable concrete, where the impermeable concrete, by mass percent, includes the carbon-mineralized slurry 0.7%, the cement 14.2%, the mineral admixture 7.5%, the aggregate 70.3%, the water 6.5% and the water reducer 0.8%.

In the step S1, the solid waste is blast furnace slag, and the industrial aid is a mixture obtained by mixing a dispersing agent, a defoaming agent, a suspending agent, a neutralizing agent, a chelating agent and a solubilizing agent at a mass ratio of 1:0.1:0.1:0.2:0.1:0.1. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propyl glycerol ether, the suspending agent is lignin, the neutralizing agent is glycine, the chelating agent is ethylene diamine tetraacetic acid, and the solubilizing agent is polypropyleneimine. In the steps S2 to S4, the feeding rate of the grinding process is 20 L/min, the grinding stay time is 30 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 23

There is a method of $CO_2$ storage and utilization of a concrete mixing plant, which includes the following steps.

At step S1, 1 mass part of concrete mixing plant waste slurry, 15 mass parts of solid waste, and 0.032 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 5 μm, a carbonization reaction degree is 30%, a solid-liquid ratio is 3:5, and the comprehensive power consumption is 60 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an impermeable concrete, where the impermeable concrete, by mass percent, includes the carbon-mineralized slurry 1.5%, the cement 10.4%, the mineral admixture 5.3%, the aggregate 75.8%, the water 6.3% and the water reducer 0.7%.

In the step S1, the solid waste is carbide slag, and the industrial aid is a mixture obtained by mixing a dispersing agent, a defoaming agent and a suspending agent at a mass ratio of 1:0.1:0.1. The dispersing agent is benzenesulfonic acid formaldehyde condensation compound, the defoaming agent is polyoxypropylene polyoxyethylene propyl glycerol ether, and the suspending agent is cellulose. In the steps S2 to S4, the feeding rate of the grinding process is 10 L/min, the grinding stay time is 40 min, and the grinding rate is 1000 r/min. There are medium balls in the grinding bin of the grinding machine, and a ball-material ratio of the medium balls to the composite slurry is 1:1. In the step S3, the gas containing $CO_2$ has a conveying rate of 800 L/min and a purity of 99.99%.

Embodiment 24

There is a method of $CO_2$ storage and utilization of a concrete mixing plant, which includes the following steps.

At step S1, 1 mass part of concrete mixing plant waste slurry, 15 mass parts of solid waste, and 0.032 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 4 μm, a carbonization reaction degree is 35%, a solid-liquid ratio is 3:5, and the comprehensive power consumption is 55 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain an impermeable concrete, where the impermeable concrete, by mass percent, includes the carbon-mineralized slurry 2.0%, the cement 4.3%, the mineral admixture 3.6%, the aggregate 83.7%, the water 6.2% and the water reducer 0.2%.

In the step S1, the solid waste is high calcium fly ash, and the industrial aid is a mixture obtained by mixing a dispersing agent, a defoaming agent, a suspending agent, a neutralizing agent, a chelating agent and a solubilizing agent at a mass ratio of 1:0.1:0.1:0.2:0.1:0.1. The dispersing agent is a mixture obtained by mixing benzenesulfonic acid formaldehyde complex and coumarone resin sodium sulfonate at a mass ratio of 1:3, the defoaming agent is polyoxypropylene polyoxyethylene propylene glycol ether mixed at a mass ratio of 1:3, the suspending agent is lignin, the neutralizing agent is glycine, the chelating agent is ethylene diamine tetraacetic acid, and the solubilizing agent is polypropyleneimine. In the steps S2 to S4, the feeding rate of the grinding process is 20 L/min, the grinding stay time is 30 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 25

There is a method of $CO_2$ storage and utilization of a concrete mixing plant, which includes the following steps.

At step S1, 1 mass part of concrete mixing plant waste slurry, 30 mass parts of solid waste, and 0.0155 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8 μm, a carbonization reaction degree is 45%, a solid-liquid ratio is 5:9, and the comprehensive power consumption is 25 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain a road concrete, where the road concrete, by mass percent, includes the carbon-mineralized slurry 0.5%, the cement 2.5%, the mineral admixture 5.3%, the aggregate 83.8%, the water 7.7% and the water reducer 0.2%.

In the step S1, the solid waste is a mixture obtained by mixing steel slag, construction waste micropowder, and magnesium slag at a mass ratio of 1:1:0.5, and the industrial aid is a mixture obtained by mixing a dispersing agent, a defoaming agent, a suspending agent, a neutralizing agent, a chelating agent, a solubilizing agent and a nucleating agent at a mass ratio of 1:0.1:0.1:0.2:0.1:0.1:0.2. The dispersing agent is a mixture obtained by mixing benzenesulfonic acid formaldehyde complex and coumaronee resin sodium sulfonate at a mass ratio of 1:3, the defoaming agent is polyoxypropylene polyoxyethylene propyl glycerol ether mixed at a mass ratio of 1:3, the suspending agent is lignin, the neutralizing agent is glycine, the chelating agent is ethylene diamine tetraacetic acid, the solubilizing agent is polypropyleneimine and the nucleating agent is triethanolamine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Embodiment 26

There is a method of $CO_2$ storage and utilization of a concrete mixing plant, which includes the following steps.

At step S1, 1 mass part of concrete mixing plant waste slurry, 30 mass parts of solid waste, and 0.0155 mass parts of industrial aid are mixed in the slurry making machine to obtain a composite slurry, where the solid-liquid ratio of the composite slurry is 1:2 and the fluidity is 200 mm.

At step S2, the composite slurry is pumped into the grinding machine and ground in the presence of the medium balls, and at this time, the fourth electronic valve is closed.

At step S3, after the slurry bin is filled up, the grinding machine is sealed, and the fourth electronic valve is opened; the $CO_2$ circulating component is used to convey the gas containing $CO_2$ in the gas storage bin to the grinding machine such that the composite slurry undergoes grinding reaction in the presence of the gas containing $CO_2$ and the medium balls and is prepared into a carbon-mineralized slurry.

At step S4, the step S3 is repeated to cyclically use the gas containing $CO_2$ until the content of the $CO_2$ is lower than 5%. In this case, the gas storage bin provides new gas containing $CO_2$ for grinding reaction so as to realize continuous production of the carbon-mineralized slurry, where a mean particle size of the carbon-mineralized slurry is 8 μm, a carbonization reaction degree is 45%, a solid-liquid ratio is 5:9, and the comprehensive power consumption is 25 kW·h.

At step S5, after an aggregate is added into the mixing machine, the material storage bin conveys the carbon-mineralized slurry into the mixing machine, and then a mineral admixture, a cement, water, a carbon-mineralized slurry, and a water reducer are added and mixed for 50 s to obtain a road concrete, where the road concrete, by mass percent, includes the carbon-mineralized slurry 1.0%, the cement 7.9%, the mineral admixture 3.5%, the aggregate 80.3%, the water 6.8% and the water reducer 0.5%.

In the step S1, the solid waste is a mixture obtained by mixing steel slag, construction waste micropowder, and magnesium slag at a mass ratio of 1:1:0.5, and the industrial aid is a mixture obtained by mixing a dispersing agent, a defoaming agent, a suspending agent, a neutralizing agent, a chelating agent, a solubilizing agent and a nucleating agent at a mass ratio of 1:0.1:0.1:0.2:0.1:0.1:0.2. The dispersing agent is a mixture obtained by mixing benzenesulfonic acid formaldehyde complex and coumaronee resin sodium sulfonate at a mass ratio of 1:3, the defoaming agent is polyoxypropylene polyoxyethylene propyl glycerol ether, the suspending agent is lignin, the neutralizing agent is glycine, the chelating agent is ethylene diamine tetraacetic acid, the solubilizing agent is polypropyleneimine and the nucleating agent is triethanolamine. In the steps S2 to S4, the feeding rate of the grinding process is 20 L/min, the grinding stay time is 20 min, and the grinding rate is 600 r/min. There are medium balls in the grinding bin of the grinding machine, and a ball-material ratio of the medium balls to the composite slurry is 3:1. In the step S3, the gas containing $CO_2$ has a conveying rate of 800 L/min and a purity of 99.99%.

Figure 8:
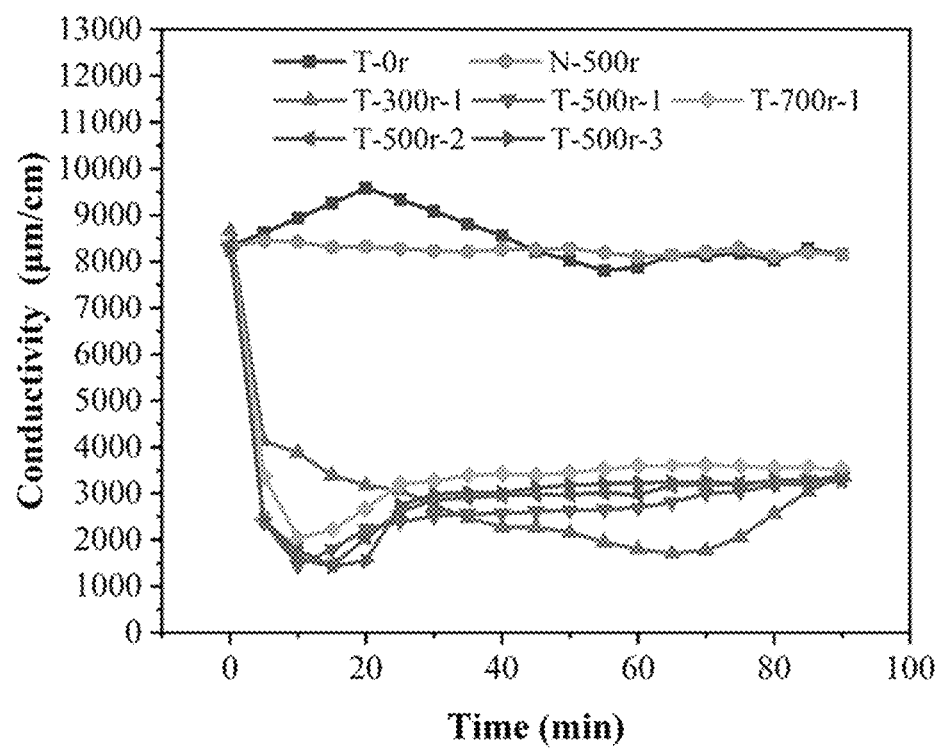
FIG. 8 shows a relational diagram of a grinding conductivity and a grinding time of a composite slurry under different conditions.

In order to further describe the principle of the present disclosure, 1 mass part of concrete mixing plant waste slurry, 65 mass parts of solid waste (steel slag, construction waste micropowder and biomass ash at a mass ratio of 1:1:0.5) are mixed in the slurry making machine to produce a composite slurry, where the solid-liquid ratio of the composite slurry is 1:3 and the fluidity is 240 mm. Next, the composite slurry is conveyed into the grinding machine and ground or not ground with introduction of $CO_2$, and ground or not ground without introduction of $CO_2$. The mineralization reaction rate under various cases is determined by testing a conductivity. Within a given period of time, the more obvious decrease of the conductivity means faster mineralization reaction, with results shown in FIG. 8. In the FIG., T-0r: $CO_2$ is introduced, grinding is not performed and the ball-material ratio of the medium balls to the composite slurry is 1:1;

N-500 r: $CO_2$ is not introduced, the rotation speed is 500 rpm, and the ball-material ratio of the medium balls to the composite slurry is 1:1; T-300r-1: $CO_2$ is introduced, the rotation speed is 300 rpm, and the ball-material ratio of the medium balls to the composite slurry is 1:1; T-300r-1: $CO_2$ is introduced, the rotation speed is 300 rpm, and the ball-material ratio of the medium balls to the composite slurry is 1:1; T-500 r-1: $CO_2$ is introduced, the rotation speed is 500 rpm, and the ball-material ratio of the medium balls to the composite slurry is 1:1; T-700 r-1: $CO_2$ is introduced, the rotation speed is 700 rpm, and the ball-material ratio of the medium balls to the composite slurry is 1:1; T-500 r-2: $CO_2$ is introduced, the rotation speed is 500 rpm, and the ball-material ratio of the medium balls to the composite slurry is 2:1; T-500 r-3: $CO_2$ is introduced, the rotation speed is 500 rpm, and the ball-material ratio of the medium balls to the composite slurry is 3:1. It can be seen from FIG. 8 that only when the grinding is performed with introduction of $CO_2$ in the presence of the medium balls can shorten the carbonization time of the mineralization reaction, because the rotary mechanical stirring provides hydrodynamic cavitation conditions. At the time of collapse of the cavitation bubbles, high-speed microjets and impact waves can be generated, which causes extreme turbulences and mechanical shear effect to be more favorable for particle refining. Further, by a liquid phase grinding mechanical force, the surfaces of the solid waste particles are continuously peeled and the diffusion rate of the $CO_2$ and $Ca^{2+}$ is increased by chemical solubilizing components, so as to fully release the carbonization potential of the solid wastes. Moreover, by controlling the proper ball-material ratio and the grinding speed, the time of mineralization reaction can be further optimized.

Finally, it should be noted that the above descriptions are only about preferred embodiments of the present disclosure and shall not be intended to limit the present disclosure. Although the present disclosure has been detailed by referring the preceding embodiments, those skilled in the arts understand that they still can make modifications to the technical solutions recorded in the embodiments of the present disclosure or make equivalent replacements to part of the technical features therein. Any modifications, equivalent substitutions and improvements and the like made within the spirit and principle of the present disclosure shall all fall within the scope of protection of the present disclosure.

What is claimed is:

1. A system for $CO_2$ storage and utilization of a concrete mixing plant, comprising a slurry making module, a cyclic grinding module and a material storage and application module, wherein, the slurry making module is configured to mix a concrete mixing plant waste slurry, a natural ore and an industrial aid to produce a composite slurry and convey the composite slurry to the cyclic grinding module;

the cyclic grinding module comprises a grinding machine, a material discharge component and a $CO_2$ circulating component, a mixing element is disposed inside the grinding machine, the mixing element comprises a hollow rotary shaft and medium balls, the material discharge component comprises a gas storage bin and a slurry bin communicated with each other and disposed up and down, the gas storage bin is connected sequentially with the grinding machine and the $CO_2$ circulating component, the gas storage bin is configured to supply a gas containing $CO_2$ to the $CO_2$ circulating component, the $CO_2$ circulating component is configured to convey the gas to the grinding machine and recover a tail gas containing $CO_2$ generated during a grinding process of the gas containing $CO_2$ and the medium balls for the composite slurry in the grinding machine, and the grinding machine is configured to grind and prepare the composite slurry in the presence of the gas containing $CO_2$ and the medium balls into a carbon-mineralized slurry and convey the carbon-mineralized slurry to the slurry bin of the material discharge component;

the material storage and application module comprises a material storage bin and a mixing machine connected with each other, and the material storage bin is configured to receive and store the carbon-mineralized slurry from the slurry bin, and the mixing machine is configured to mix and prepare the carbon-mineralized slurry into a commodity concrete;

the slurry making module comprises a sand stone separating machine, a sand removing machine and a slurry making machine connected sequentially, the slurry making machine comprises a machine body, a slurry outlet at an outer side of the machine body, a material-adding opening on a top of the machine body, a first rotary shaft in a middle of the top of the machine body and a first motor on the top of the machine body, rotary blades are disposed at a lower end of the first rotary shaft and extended into the machine body, and an upper end of the first rotary shaft is connected with a drive part of the first motor through a bevel gear;

the grinding machine comprises a cylinder body, a material inlet at a bottom of the cylinder body, a screen in the cylinder body, a sealed console on a top of the cylinder body and the mixing element in the sealed console, the material inlet is connected with the slurry outlet of the slurry making machine, the screen divides an interior of the cylinder body into an above-screen finished product bin and an under-screen grinding bin, a gas inlet provided with a gas pipe is opened on a top of the sealed console, the mixing element further comprises a second motor and a drive rotary rod, an output end of the second motor is fixedly connected with the drive rotary rod, the drive rotary rod is fixedly connected with the hollow rotary shaft, a top of the hollow rotary shaft is connected with the gas pipe, a lower end of the hollow rotary shaft extends to the grinding bin, centrifugal blades and uniformly-distributed gas outlets are disposed on the hollow rotary shaft in the grinding bin, and a first material outlet is disposed at an outer side of the finished product bin;

a slurry inlet is disposed at a side of the gas storage bin of the material discharge component, the slurry inlet is connected with the first material outlet of the finished product bin, a gas relief opening and a gas pressure meter are disposed on a top of the gas storage bin, the $CO_2$ circulating component is provided with a circulating gas inlet and a circulating gas outlet, the gas relief opening of the gas storage bin is connected with the circulating gas inlet of the $CO_2$ circulating component, the circulating gas outlet is connected with the gas inlet of the grinding machine, and an outlet end of the slurry bin of the material discharge component is connected with a U-shaped pipe;

a feed pipe connected with the U-shaped pipe is disposed at an upper end of an outer side of the material storage bin, and a second material outlet connected with the mixing machine is disposed on a top of the material storage bin.

2. The system of claim 1, wherein a cooling cylinder is disposed outside the cylinder body of the grinding machine, and a lower part and an upper part of the cooling cylinder are respectively provided with a water inlet and a water outlet; an inner bottom of the finished product bin of the grinding machine has an angle of inclination of 5 to 15°.

3. The system of claim 2, wherein a weight measurement meter on which a display is disposed is further disposed at a bottom of the machine body of the slurry making machine; a first electronic valve and a first feed pump are sequentially disposed on the slurry outlet of the slurry making machine;
a second electronic valve and a strainer are sequentially disposed on the material inlet of the grinding machine, and the water inlet of the cooling cylinder is provided with a third electronic valve;
a fourth electronic valve and a second feed pump are sequentially disposed on the U-shaped pipe;
a rotary bearing is disposed on an upper end and a lower end of an interior of the material storage bin respectively, the rotary bearing is connected with a rotational shaft, an end of the rotational shaft away from the rotary bearing is provided with helical blades, and the second material outlet is provided with a third feed pump.

4. The system of claim 3, further comprising a control module configured to control the slurry making module, the cyclic grinding module and the material storage and application module;
the control module is electrically connected with the first electronic valve, the second electronic valve, the third electronic valve, the fourth electronic valve, the first feed pump, the second feed pump, the third feed pump, the first motor, the second motor, the $CO_2$ circulating component, the sand stone separating machine and the sand removing machine respectively.

5. A method of $CO_2$ storage and utilization of a concrete mixing plant by using the system of claim 4, comprising the following steps:
at step S1, obtaining a composite slurry by mixing a concrete mixing plant waste slurry, a solid waste, a natural ore and an industrial aid in the slurry making machine;
at step S2, conveying the composite slurry into the grinding machine and performing grinding in the presence of the medium balls;
at step S3, after the slurry bin is filled up, sealing the grinding machine and using the $CO_2$ circulating component to convey a gas containing $CO_2$ in the gas storage bin to the grinding machine to enable the composite slurry to go through grinding reaction in the presence of the gas containing $CO_2$ and the medium balls and be prepared into a carbon-mineralized slurry;
at step S4, repeating the step S3 and cyclically using the gas containing $CO_2$ until the content of $CO_2$ is lower than 5%, and providing new gas containing $CO_2$ by the gas storage bin to perform grinding reaction, so as to realize continuous production of the carbon-mineralized slurry; and
at step S5, conveying the carbon-mineralized slurry into the mixing machine and mixing with a cement, a mineral admixture, an aggregate, water and a water reducer to obtain a carbon fixation commodity concrete;
wherein in the grinding process of the steps S2 to S4, a feeding rate is 10 to 50 L/min, a stay time in the grinding bin is not greater than 40 min, a grinding rate is 150 to 1000 r/min, and a ball-material ratio of the medium balls to the composite slurry is 1:1 to 5:1.

6. The method of claim 5, wherein a solid-liquid ratio of the composite slurry is 3:1 to 3:17, and a fluidity is 160 to 280 mm;
the solid waste comprises at least one of steel slag, blast furnace slag, high calcium fly ash, electric furnace slag, carbide slag, magnesium slag, biomass ash, cement kiln dust, municipal waste incineration ash, and construction waste micropowder, and a total mass ratio of CaO, MgO and FeO in the solid waste is ≥10%;
the natural ore comprises at least one of wollastonite, olivine, serpentine, talcum, pyroxene and feldspar;
a $CO_2$ content of the gas containing $CO_2$ is ≥30%, concentrations of $NO_x$ and $SO_2$ are ≤400 mg/m$^3$ and ≤200 mg/m$^3$ respectively, and a conveying rate of carbon dioxide is 200 to 1000 L/min; when a pressure of the gas storage bin is 0.18 MPa, the gas containing $CO_2$ is conveyed, and when the pressure of the gas storage bin is ≥0.25 MPa, the conveying of the gas containing $CO_2$ is stopped;
a ratio of a content of the industrial aid to a solid mass of the composite slurry is 0.01 to 0.2%, and the industrial aid comprises at least one of a dispersing agent, a defoaming agent, a suspending agent, a neutralizing agent, a chelating agent, a solubilizing agent and a nucleating agent;
a mean particle size of the carbon-mineralized slurry is ≤20 μm, a carbonization reaction degree is 10 to 80%, and a solid-liquid ratio is 4:1 to 2:11;
a comprehensive power consumption of continuous production of the carbon-mineralized slurry is 12 to 80 kW·h.

7. The method of claim 6, wherein when the solid waste is at least one of steel slag, carbide slag, magnesium slag, construction waste micropowder, biomass ash, cement kiln dust and municipal waste incineration ash, an absolute dry mass ratio of the concrete mixing plant waste slurry to the solid waste to the natural ore is 1:15 to 65:0 to 20;
when the solid waste is at least one of blast furnace slag, high calcium fly ash and electric furnace slag, an absolute dry mass ratio of the concrete mixing plant waste slurry to the solid waste to the natural ore is 1:1 to 15:0 to 20.

8. The method of claim 7, wherein in the step S5, a mixing sequence is the aggregate, the mineral admixture, the cement, the water, the carbon-mineralized slurry and the water reducer, and a forced mixing time is 10 to 90 s;
the carbon fixation commodity concrete comprises ordinary concrete, underwater concrete, fine aggregate concrete, impermeable concrete and road concrete.

9. The method of claim 8, wherein the ordinary concrete comprises, by mass percent, the carbon-mineralized slurry 0.5 to 12.5%, the cement 2.5 to 15%, the mineral admixture 3.5 to 7.5%, the aggregate 70.3 to 83.8%, the water 6.2 to 7.7%, and the water reducer 0.2 to 0.8%;
the underwater concrete comprises, by mass percent, the carbon-mineralized slurry 1.5 to 12.5%, the cement 2.5 to 15%, the mineral admixture 4.5 to 6.0%, the aggregate 71.5 to 75.9%, the water 6.2 to 6.4%, and the water reducer 0.4 to 0.6%, and a mean particle size of the carbon-mineralized slurry in the underwater concrete is not greater than 2 μm;
the fine aggregate concrete comprises, by mass percent, the carbon-mineralized slurry 0.5 to 5.6%, the cement 2.5 to 8.1%, the mineral admixture 3.5 to 5.2%, the aggregate 80.1 to 83.8%, the water 6.8 to 7.7%, and the water reducer 0.3 to 0.5%, and a mean particle size of the carbon-mineralized slurry in the fine aggregate concrete is 10 to 20 μm;

the impermeable concrete comprises, by mass percent, the carbon-mineralized slurry 0.7 to 11.7%, the cement 4.3 to 14.2%, the mineral admixture 3.6 to 7.5%, the aggregate 70.3 to 83.7%, the water 6.2 to 6.5%, and the water reducer 0.2 to 0.8%, and a mean particle size of the carbon-mineralized slurry in the impermeable concrete is 2 to 5 m;

the road concrete comprises, by mass percent, the carbon-mineralized slurry 0.5 to 5.4%, the cement 2.5 to 7.9%, the mineral admixture 3.5 to 5.3%, the aggregate 80.3 to 83.8%, the water 6.8 to 7.7%, and the water reducer 0.2 to 0.5%, and a mean particle size of the carbon-mineralized slurry in the road concrete is 6 to 10 μm.

* * * * *